United States Patent Office 3,022,340
Patented Feb. 20, 1962

3,022,340
HYDROXYMETHYLATION OF OLEFINIC ORGANIC COMPOUNDS
Herman S. Bloch, Skokie, Ill., assignor to Universal Oil Products Company, Des Plaines, Ill., a corporation of Delaware
No Drawing. Filed Apr. 13, 1959, Ser. No. 805,726
7 Claims. (Cl. 260—491)

This invention relates to a process for the hydroxymethylation of olefinic organic compounds. More specifically it relates to an improved process for the catalytic reaction of olefinic organic compounds with carbon monoxide and hydrogen to form said hydroxymethylated organic compounds.

The reaction of olefinic orgnic compounds with carbon monoxide and hydrogen in the presence of a cobalt catalyst has been practiced commercially for some time. Generally the reaction is carried out in the presence of dicobalt octacarbonyl and/or cobalt hydrocarbonyl as catalyst. Both carbonyls function as homogeneous catalysts such that in a continuous process the catalytic element must be constantly supplied to the reaction zone as well as separated from the reaction product. That this presents a problem is evidenced by the voluminous prior art relating solely to the separation of cobalt carbonyls from the reaction product. The preparation of hydroxymethylated organic compounds in the manner above described is normally a two step operation, the second step involving hydrogenation of aldehydes formed in the initial reaction.

It is therefore a primary object of the present invention to prepare from olefinic organic compounds, carbon monoxide, and hydrogen, hydroxymethylated organic compounds possessing one or more carbon atoms than the starting material, in a system wherein the catalyst is contained within a fixed bed. It is a further object of this invention to utilize a solid catalyst capable of catalyzing the one step hydroxymethylation of olefinic organic compounds under milder conditions than otherwise possible.

In its broadest aspect this invention embodies a process for the hydroxymethylation of an olefinic organic compound which comprises forming a mixture consisting essentially of said olefinic organic compound, carbon monoxide and hydrogen, and reacting said mixture in the presence of a catalyst comprising a solid adsorbent material impregnated with a metal of the iron group of the periodic table and a halide selected from the group consisting of a boron halide and a hydrogen halide, and recovering the resulting hydroxymethylated compound.

Another embodiment resides in a process for the hydroxymethylation of an olefinic hydrocarbon which comprises forming a mixture consisting essentially of said olefinic hydrocarbon, carbon monoxide and hydrogen, and reacting said mixture in the presence of a catalyst comprising an activated alumina impregnated with cobalt and boron trifluoride, at a reaction temperature of from about 25° C. to about 200° C. and at a pressure of from about 25 atmospheres to about 750 atmospheres, and recovering the resulting hydroxymethylated hydrocarbon.

A specific embodiment resides in the process for the hydroxymethylation of ethylene which comprises forming a mixture consisting essentially of carbon monoxide, ethylene and hydrogen, and reacting said mixture in the presence of a catalyst comprising gamma alumina impregnated with cobalt and boron trifluoride, at a reaction temperature of from about 50° C. to about 170° C. and at a pressure of from about 50 atmospheres to about 400 atmospheres, and recovering the resulting n-propyl alcohol.

Pursuant to the objectives of this invention as set forth above, carbon monoxide and hydrogen are reacted with an olefinic organic compound in the presence of a solid catalyst in the manner hereinafter described in the following detailed specifications.

The term "olefinic organic compound" is intended to include olefinic hydrocarbons. Suitable olefinic hydrocarbons are such as ethene, propene, 2-methylpropene, 1-butene, 2-butene, 1,3-butadiene, 2-methyl-1-butene, 3-methyl-1-butene, 2-methyl-2-butene, 2-methyl-1,3-butadiene, 2,3-dimethyl-1,3-butadiene, 1-pentene, 2-pentene, 1,3-pentadiene, 2-methyl-1-pentene, 3-methyl-1-pentene, 4-methyl-1-pentene, etc., as well as their higher homologues. Cyclopentene, cyclopentadiene, cyclohexene, 1,3-cyclohexadiene, 1,4-cyclohexadiene, 1-vinyl-2-cyclohexene, 1-vinyl-3-cyclohexene, etc., are representative of cycloolefins which may be utilized as olefinic hydrocarbons.

Organic compounds in general, which contain a carbon to carbon double bond within their molecular structure fall within the broad scope of this invention. For example vinyl acetate, allyl acetate, crotonyl acetate, ethyl acrylate, methyl acrylate, ethyl crotonate, etc., are suitable as well as 3-butenenitrile, 4-pentenenitrile, 2-hexenenitrile, 2-heptenenitrile, etc., and others such as vinyl ether, vinyl methyl ether, vinyl ethyl ether, allyl ether, allyl ethyl ether, etc., in addition to higher homologues.

This process employs a catalyst which comprises a solid adsorbent material containing a metal of the iron group of the periodic table and a halide selected from a group consisting of a boron hailde and a hydrogen halide.

Suitable solid adsorbent materials are such as activated carbon, fuller's earth, activated clays, bone char, activated aluminas, activated silicas, etc., with the activated aluminas, and particularly gamma and theta aluminas, being preferred.

The selected solid adbsorbent is impregnated with a metal of the iron group of the periodic table. The impregnation is accomplished by the utilization of a suitable salt of a metal of said iron group. Included in this group are salts of iron, nickel, and cobalt. Nickel chloride, nickel bromide, nickel iodide, nickel fluoride, nickel nitrate, nickel sulfate, nickel acetate, nickel formate, etc., ferric chloride, ferric bromide, ferric fluoride, ferric nitrate, ferric sulfate, ferric formate, ferric acetate, etc., cobalt nitrate, cobalt sulfate, cobalt chloride, cobalt bromide, cobalt fluoride, cobalt iodide, cobalt acetate, cobalt formate, etc., are exemplary of salts utilizable for this process, the cobalt salts being preferred.

The catalyst is further impregnated with a halide of hydrogen or boron as an active component. The preferred impregnation is with boron trifluoride. Boron tribromide, boron trichloride, etc., as well as hydrogen fluoride, hydrogen bromide, hydrogen chloride, etc., can be used, although the use of any other particular halide does not necessarily result in a catalyst with equivalent catalytic properties.

Preparation of the catalyst can proceed by any conventional or convenient method. One such method utilized is that by which a salt of a metal of the iron group of the periodic table is made into a water solution, the quantity of metal salt dissolved being such as to insure a metal deposit of from about 5% to about 28% and preferably from about 10% to about 20% by weight of the preferred catalyst support. The selected adsorbent material is treated with water sufficient to form an aqueous slurry and the previously prepared aqueous solution of a salt of a metal of the iron group of the periodic table is added thereto. The composite thus formed is dried at a temperature in the range of from about 100° C. to about 200° C., after which the catalyst may be formed into pills or other suitable shapes by any conventional method. The catalyst is treated with a halide of boron or hydrogen such that the catalyst has a halide content of from about 2% to about 20% by weight, and preferably of from about 6% to about 12%. Said halide treatment may take place in a closed cylinder under superatmospheric pressure or by exposure to a gas stream composed of a selected halide. The catalyst is then calcined at a temperature in the range of from about 300° C. to about 650° C. The order of impregnation of the solid adsorbent material may be reversed, or the impregnations can be performed simultaneously.

A preferred catalyst then consists of an activated alumina impregnated with about 10% to about 20% by weight of cobalt and with boron trifluoride sufficient to provide a fluoride content of from about 6% to about 12% by weight.

When it is desirable to extend the operation of this process beyond the normal life of the catalyst, a boron or hydrogen halide is supplied to the system to be adsorbed on the solid adsorbent catalyst support thus replacing such halide as may have been washed away during extended operations.

The process is pressure dependent, resulting in the adsorption of carbon monoxide and hydrogen. Accordingly a superatmospheric pressure in the range of from about 25 atmospheres to about 750 atmospheres, and preferably in the range of from about 50 atmospheres to about 400 atmospheres is utilized.

Stoichiometrically, the reaction of olefinic organic compounds with carbon monoxide and hydrogen to yield hydroxymethylated non-olefinic organic compounds requires a ratio of one mole of olefinic organic compound to one mole of carbon monoxide to two moles of hydrogen. However it is preferable to operate with an excess of carbon monoxide as a deterrent to undesirable side reactions such as polymerization of the olefin. It is also preferable to operate with an excess over the stoichiometric amount of hydrogen as this tends to increase the yields of the hydroxymethylated product. Accordingly, a mole ratio of carbon monoxide to olefinic organic compound of from about 1:1 to about 5:1, and a mole ratio of hydrogen to olefinic organic compound of from about 2:1 to about 10:1 is preferred.

The reaction to which this process applies may be effected at a temperature in the range of from about 25° C. to about 200° C. However, a preferred range is from about 50° C. to about 170° C. although this may vary depending upon the olefinic organic compound utilized as a reactant.

When the process of this invention is carried out in a batchwise manner as hereinafter described, a residence time in the range of from about 1 hour to about 10 hours is suitable while a residence time of from about 2 hours to about 6 hours is preferred. In a continuous flow operation a residence time which is compatible with the process requirements as well as the economic aspects of the present process is readily determinable by anyone skilled in the art through routine operational tests.

This process is operable under batch type or continuous flow conditions. In a batch type process a high pressure reaction vessel designed for the introduction of gaseous reactants and suitably equipped with heating and agitating devices can be employed. An autoclave is an example of such apparatus as above described. The catalyst is placed within the reaction chamber of the autoclave and the chamber is flushed one or more times with carbon monoxide. The reactants are then pressured into the autoclave and heated, with agitation, to a predetermined temperature. On completion of the proper residence time the autoclave is cooled to about room temperature and the pressure released. The autoclave is flushed with hydrogen. The product is decanted from the catalyst and further treated to obtain the desired degree of purity.

In a continuous flow type of process the reactants are continually introduced by a compressor to a high pressure reaction chamber, suitably equipped with proper heating means. The reactants can be introduced in individual streams or in admixture with any one or both of the other reactants. The reactants are preheated before introduction to the fixed catalyst bed located within the high pressure reactor. The reactor effluent is passed to a high pressure separator suitably cooled to insure separation of gaseous and liquid phases. The gaseous phase is recycled to the reaction zone while the liquid phase is metered through a pressure reducing valve and passed to a fractionating column for further separation and recovery of desired product.

The following examples are given by way of illustration and are not intended to unduly limit the generally broad scope of this invention.

*Example I*

5 grams of a catalyst consisting of gamma alumina impregnated with about 15% by weight of cobalt and about 10% by weight of boron trifluoride is placed in a glass liner and inserted in a 1 liter autoclave. The autoclave is flushed with carbon monoxide. The autoclave is then charged with about 250 pounds per square inch of carbon monoxide followed by about 250 pounds per square inch of ethylene and finally hydrogen is added to bring the total pressure to about 1000 pounds per square inch. The autoclave is then heated to a temperature of about 150° C. and agitated for a period of approximately 4 hours after which time no further pressure drop is apparent. The autoclave is cooled to room temperature and depressured. The liquid product is decanted from the catalyst and 30 grams of n-propanol recovered therefrom.

*Example II*

7 grams of a catalyst comprising gamma alumina impregnated with about 15% by weight of cobalt and about 10% by weight of boron trifluoride is placed in a glass liner and inserted in a 1 liter autoclave. The autoclave is flushed with carbon monoxide. The autoclave is then charged with about 250 pounds per square inch of carbon monoxide. 35 grams of 2-methyl-1-butene is added to the autoclave by means of a compressor and the total pressure is brought to about 1000 pounds per square inch with hydrogen. The temperature is raised to 160° C. and the autoclave agitated at this temperature for a period of approximately 4 hours after which time the pressure drop appears to be complete. The autoclave is cooled to room temperature and depressurized. The liquid product is decanted from the catalyst and 27 grams of 3-methyl pentanol and some polymer is recovered therefrom.

*Example III*

7 grams of catalyst consisting of gamma alumina impregnated with about 15% by weight of cobalt and about 10% by weight of boron trifluoride is placed in a glass liner and inserted in a 1 liter autoclave. The autoclave is then flushed with carbon monoxide. The autoclave is charged with about 250 pounds per square inch of carbon monoxide. 34 grams of cyclopentene is then added to the autoclave by means of a compressor and the total pressure brought to 1000 pounds per square inch with hydrogen. The temperature is raised to about 160° C. and the autoclave is agitated at this temperature for a period of approximately 4 hours after which time the pressure drop appears to be complete. The autoclave is cooled to room temperature and depressured. The liquid product is decanted from the catalyst and 30 grams of cyclopentylcarbinol is recovered therefrom.

*Example IV*

8 grams of catalyst consisting of gamma alumina impregnated with about 15% by weight of cobalt and about 10% by weight of boron trifluoride is placed in a glass liner and inserted in a 1 liter autoclave. The autoclave is flushed with carbon monoxide. The autoclave is then charged with about 250 pounds per square inch of carbon monoxide followed by about 500 pounds per square inch of hydrogen and finally 54 grams of vinylcyclohexene is added by means of a compressor. The temperature is raised to about 165° C. and the autoclave is agitated at this temperature for a period of approximately 4 hours. There is a noticeable pressure drop. The autoclave is cooled to room temperature and depressured. The liquid product is decanted from the catalyst and 25 grams of cyclohexylpropanol is recovered therefrom.

*Example V*

7 grams of catalyst consisting of gamma alumina impregnated with about 15% by weight of cobalt and about 10% by weight of boron trifluoride is placed in a glass liner and inserted in a 1 liter autoclave. The autoclave is then charged with about 250 pounds per square inch of carbon monoxide. 50 grams of allyl acetate is added by means of a compressor and the pressure is finally brought to 1000 pounds per square inch with hydrogen. The temperature is raised to about 160° C. and the autoclave agitated at this temperature for approximately 4 hours after which time the pressure drop appears to be complete. The autoclave is cooled to room temperature and depressured. The liquid product is decanted from the catalyst and 42 grams of tetramethylene glycol monoacetate is recovered therefrom.

*Example VI*

8 grams of catalyst consisting of gamma alumina impregnated with about 15% by weight of cobalt and about 10% by weight of boron trifluoride is placed in a glass liner and inserted in a 1 liter autoclave. The autoclave is flushed with carbon monoxide. The autoclave is then pressured with about 250 pounds per square inch of carbon monoxide. 56 grams of 2-methyl-4,4-dimethyl-1-pentene is added by means of a compressor and the pressure is finally brought to 1000 pounds per square inch with hydrogen. The temperature is raised to about 165° C. and the autoclave is agitated at this temperature for a period of approximately 4 hours. There is a noticeable drop in pressure. The autoclave is cooled to room temperature and depressured. The liquid product is decanted from the catalyst and 55 grams of isononyl alcohol is recovered therefrom.

I claim as my invention:

1. A process for the hydroxymethylation of an olefinic hydrocarbon which comprises forming a mixture consisting essentially of said olefinic hydrocarbon, carbon monoxide and hydrogen in a mol ratio of carbon monoxide to olefinic hydrocarbon of from about 1:1 to about 5:1 and a mol ratio of hydrogen to olefinic hydrocarbon of from about 2:1 to about 10:1, in the presence of a catalyst comprising a solid adsorbent material impregnated with cobalt and boron trifluoride, at a reaction temperature of from about 25° C. to about 200° C., and at a pressure of from about 25 atmospheres to about 750 atmospheres, and recovering the resulting hydroxymethylated hydrocarbon.

2. A process for the hydroxymethylation of an olefinic hydrocarbon which comprises forming a mixture consisting essentially of said olefinic hydrocarbon, carbon monoxide and hydrogen in a mol ratio of carbon monoxide to olefinic hydrocarbon of from about 1:1 to about 5:1 and a mol ratio of hydrogen to olefinic hydrocarbon of from about 2:1 to about 10:1, and reacting said mixture in the presence of a catalyst comprising an activated alumina impregnated with cobalt and boron trifluoride, at a reaction temperature of from about 25° C. to about 200° C., and at a pressure of from about 25 atmospheres to about 750 atmospheres, and recovering the resulting hydroxymethylated hydrocarbon.

3. A process for the hydroxymethylation of ethylene which comprises forming a mixture consisting essentially of ethylene, carbon monoxide and hydrogen in a mol ratio of carbon monoxide to ethylene of from about 1:1 to about 5:1 and a mol ratio of hydrogen to ethylene of from about 2:1 to about 10:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting n-propyl alcohol.

4. A process for the hydroxymethylation of 2-methyl-1-butene which comprises forming a mixture consisting essentially of 2-methyl-1-butene, carbon monoxide and hydrogen in a mol ratio of carbon monoxide to 2-methyl-1-butene of from about 1:1 to about 5:1 and a mol ratio of hydrogen to 2-methyl-1-butene of from about 2:1 to about 10:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting 3-methyl-1-pentanol.

5. A process for the hydroxymethylation of cyclopentene which comprises forming a mixture consisting essentially of cyclopentene, carbon monoxide and hydrogen in a mol ratio of carbon monoxide to cyclopentene of from about 1:1 to about 5:1 and a mol ratio of hydrogen to cyclopentene of from about 2:1 to about 10:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting cyclopentylcarbinol.

6. A process for the hydroxymethylation of 1-vinyl-3-cyclohexene which comprises forming a mixture consisting essentially of 1-vinyl-3-cyclohexene, carbon monoxide and hydrogen in a mol ratio of carbon monoxide to 1-vinyl-3-cyclohexene of from about 1:1 to about 5:1 and a mol ratio of hydrogen to 1-vinyl-3-cyclohexene of from about 2:1 to about 10:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting cyclohexylpropanol.

7. A process for the hydroxymethylation of allyl acetate which comprises forming a mixture consisting essentially of allyl acetate, carbon monoxide and hydrogen in a mol ratio of carbon monoxide to allyl acetate of from about 1:1 to about 5:1 and a mol ratio of hydrogen to allyl acetate of from about 2:1 to about 10:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting 4-acetoxybutanol.

References Cited in the file of this patent

UNITED STATES PATENTS

| | | |
|---|---|---|
| 2,437,600 | Gresham et al. | Mar. 9, 1948 |
| 2,500,913 | Schexnailder | Mar. 14, 1950 |
| 2,670,385 | Rosenthal et al. | Feb. 23, 1954 |
| 2,683,177 | Field | July 6, 1954 |

FOREIGN PATENTS

| | | |
|---|---|---|
| 881,645 | Germany | May 21, 1953 |

OTHER REFERENCES

Martin et al.: "Boron Trifluoride and Its Derivatives," 1949, pages 170, 182, 183.

Sherwood: Petroleum Processing, 8, 244 (1953).

Enjoy: "Higher Oxo Alcohols," 1957, pages 7, 16, 18 and 19.

Gerrard et al.: Chem. Rev., 58, 1081–82 (1958).

UNITED STATES PATENT OFFICE
CERTIFICATE OF CORRECTION

Patent No. 3,022,340                        February 20, 1962

Herman S. Bloch

It is hereby certified that error appears in the above numbered patent requiring correction and that the said Letters Patent should read as corrected below.

Column 5, line 52, before "in" insert -- and reacting said mixture --.

Signed and sealed this 31st day of July 1962.

(SEAL)
Attest:

ERNEST W. SWIDER
Attesting Officer

DAVID L. LADD
Commissioner of Patents